Figure 1:
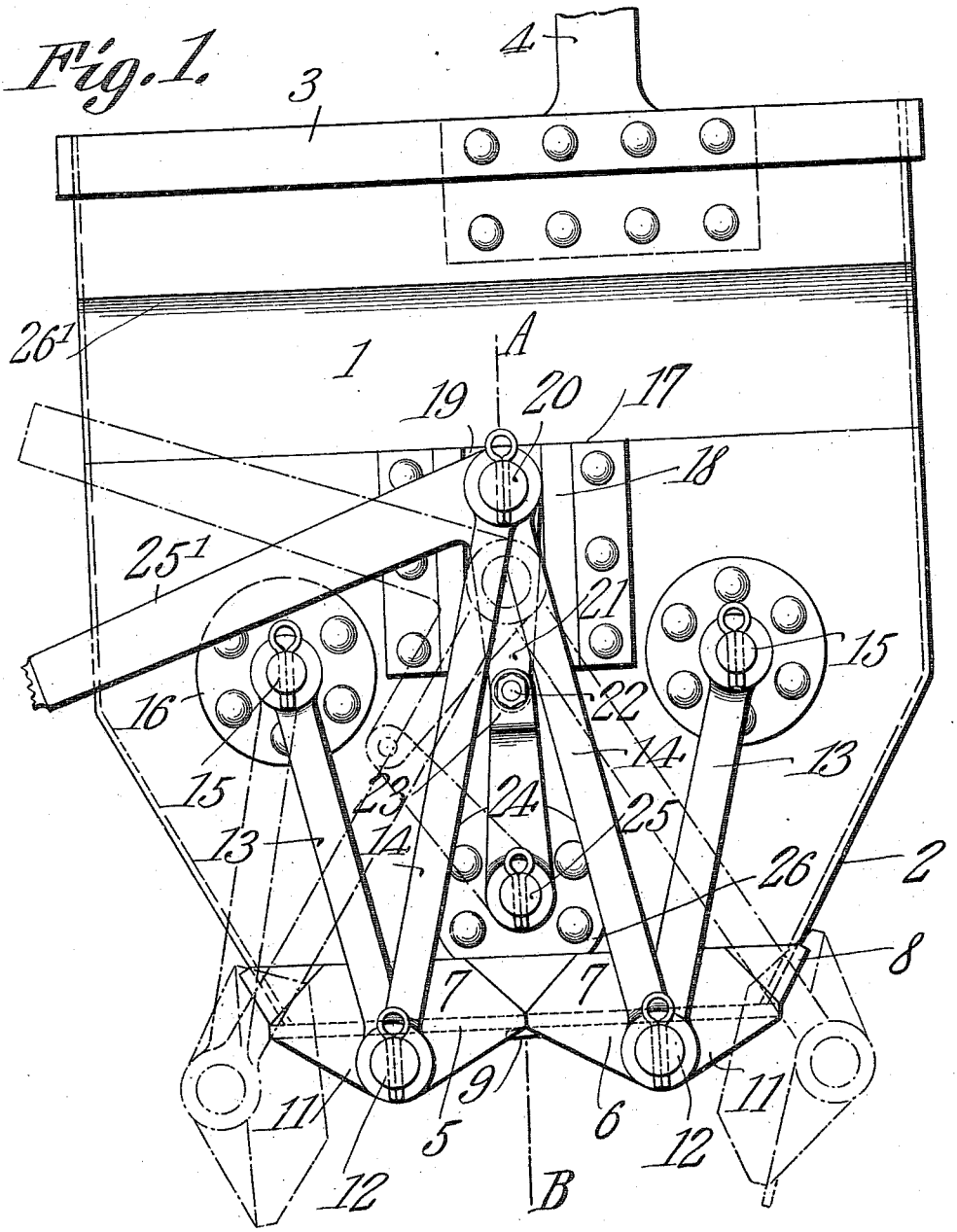

S. A. COONEY.
CONVEYER BUCKET.
APPLICATION FILED OCT. 15, 1909.

979,653.

Patented Dec. 27, 1910.
3 SHEETS—SHEET 1.

Witnesses

Inventor
Sebern A. Cooney.
By C. A. Snow & Co.
Attorneys

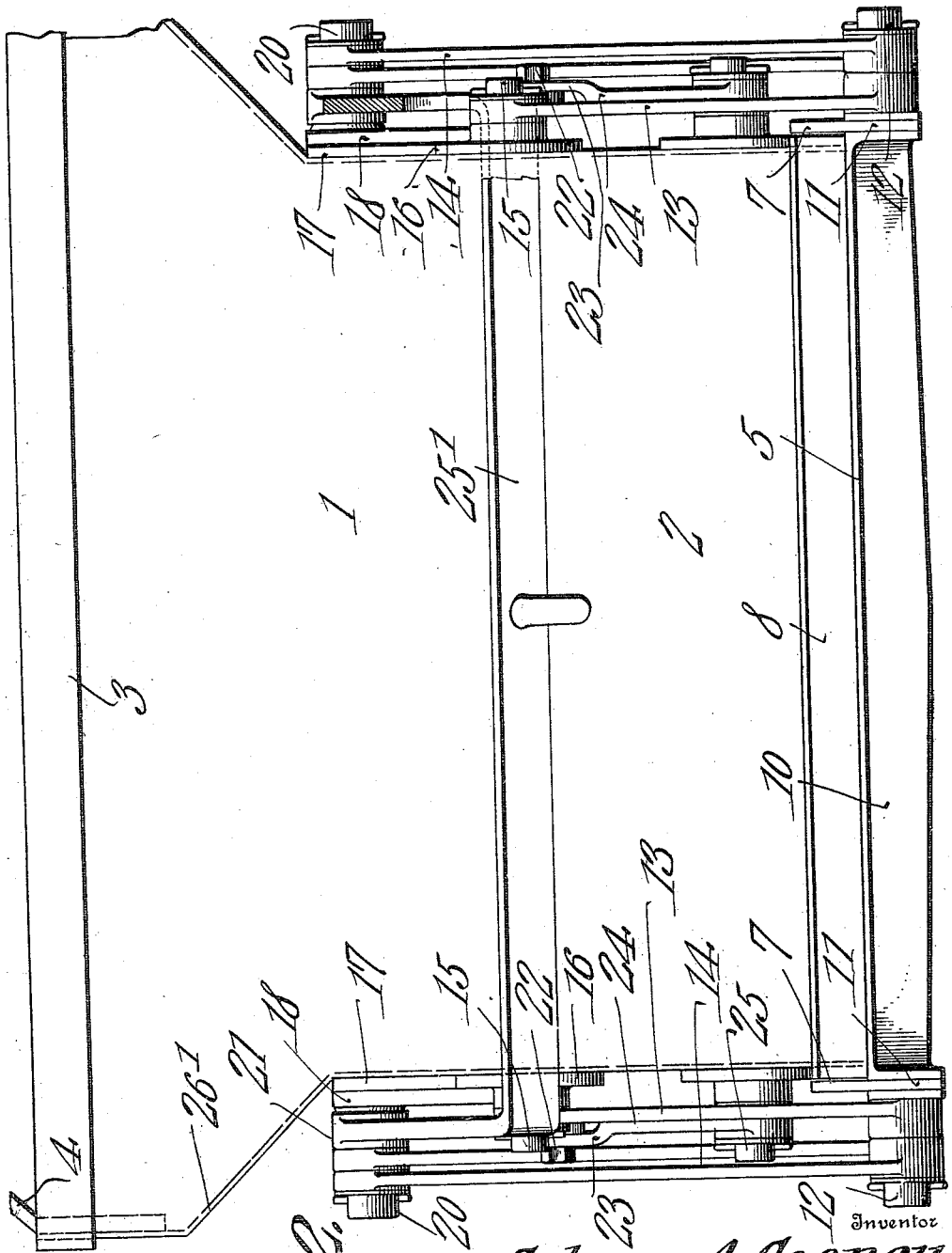

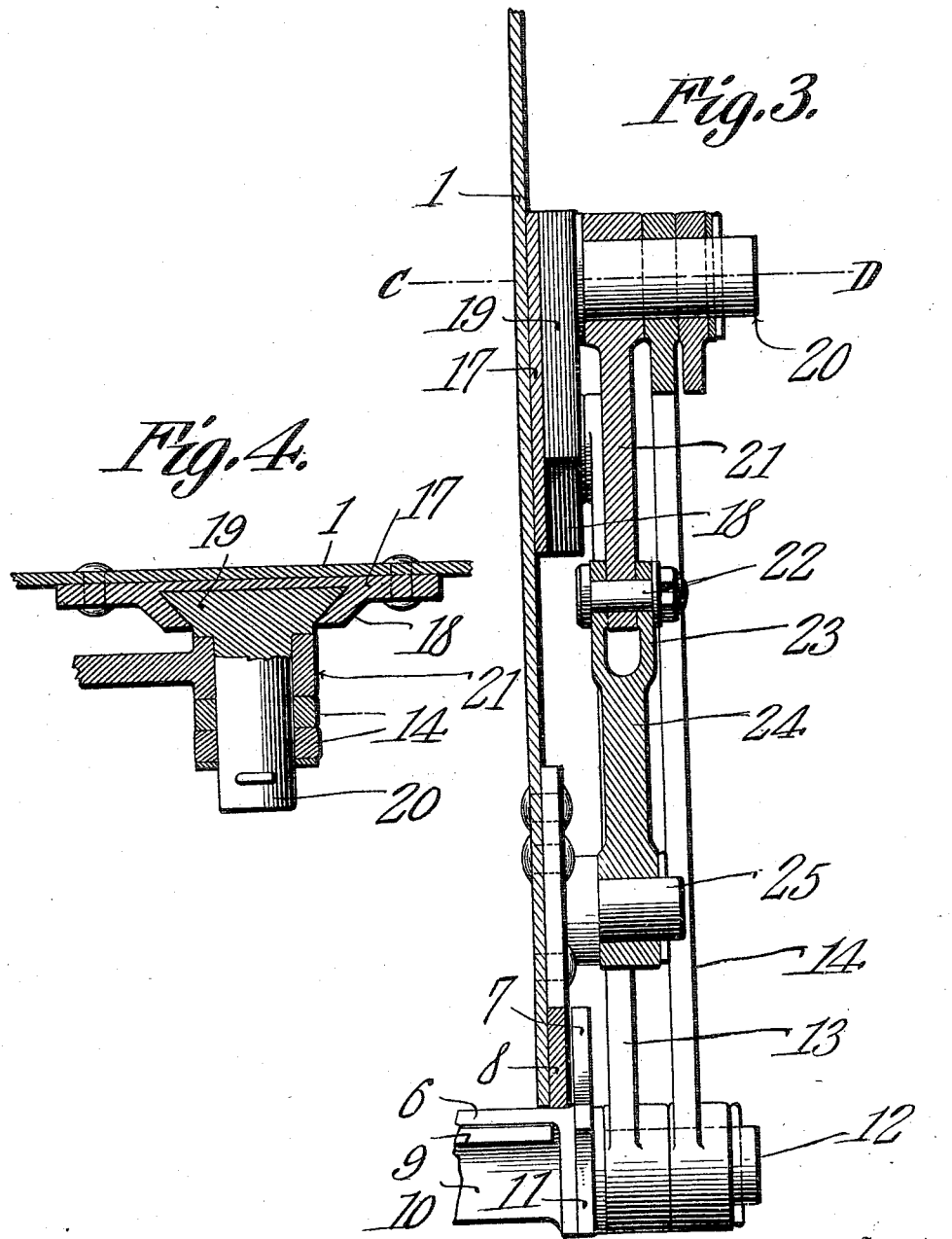

ated force tending to move it to the open position.

UNITED STATES PATENT OFFICE.

SEBERN A. COONEY, OF TRENTON, NEW JERSEY, ASSIGNOR OF ONE-HALF TO JOHN A. ROEBLING'S SONS CO., OF TRENTON, NEW JERSEY.

CONVEYER-BUCKET.

979,653.

Specification of Letters Patent. Patented Dec. 27, 1910.

Application filed October 15, 1909. Serial No. 522,771.

*To all whom it may concern:*

Be it known that I, SEBERN A. COONEY, a citizen of the United States, residing at Trenton, in the county of Mercer and State of New Jersey, have invented a new and useful Conveyer-Bucket, of which the following is a specification.

This invention has reference to improvements in conveyer buckets designed more particularly for use in connection with a double rope tram-way system wherein the material to be transported is deposited in buckets or containers at a loading station, and these buckets or containers are moved along an aerial track in the form of a suspended cable to another station where the bucket is tripped in a manner to cause the escape of its load, after which the bucket is returned to its normal closed position ready to receive another load, the parts being self locking, and the bucket is moved back to the initial or loading station along another aerial cable track. The system referred to is such that the buckets traverse both the loading and unloading stations, but with the exception of the loading station, the buckets are constantly under the control of an endless power cable, the buckets remaining gripped to such cable from the time they leave the loading station until they again return thereto, but at the loading station the buckets are released from the power cable and are then under the control of another power means, causing their travel through the loading station at another rate of speed than when under the control of the power cable, while at the loading station the bucket is under the control of an operator. The system thus briefly described forms the subject matter of another application for patent, the present invention being limited to the structure of the bucket itself.

The object of the present invention is to provide a simple and economical form of bucket which is highly efficient for the purposes of the system, and wherein there are no moving parts liable to become injured by the lodgment thereon of the material being transported. At the same time the bucket is provided with a closure so designed as to remain positively closed during transportation even against any tendency of the load to cause the opening of the bucket, but the closure will readily yield to a properly directed force tending to move it to the open position.

The invention will be best understood from a consideration of the following detail description taken in connection with the accompanying drawings forming a part of this specification, in which drawings—

Figure 1 is an end elevation of the bucket showing the open position of the bucket closing mechanism in dotted lines. Fig. 2 is a side elevation of the bucket. Fig. 3 is a section on the line A—B of Fig. 1 but drawn to a larger scale. Fig. 4 is a section on the line C—D of Fig. 3.

Referring to the drawings there is shown a bucket body 1, which, in the particular showing of the drawings, has the lower portions 2 of the sides inwardly directed toward the central vertical longitudinal plane of the bucket, so that material escaping through the bottom of the bucket will be directed away from the sides of the bucket into a narrower path of delivery than would be the case were the sides of the bucket parallel one to the other from the top or rim of the bucket to the bottom thereof. About the top of the bucket there is provided a strengthening rim 3 and the bucket may be supported by a suitable bail 4, which latter, however, need not be particularly described, and only the bucket end of the bail is shown.

The bottom of the bucket is composed of two like members 5 and 6, having at the ends upturned flanges 7 designed to embrace the ends of the bucket and about the lower edge of the bucket there is formed a strengthening flange 8. When the members 5 and 6 are in the closed position against the bottom of the bucket, a lip 9 on one member underlaps the other member at this point. Each member 5 and 6 may be strengthened by a longitudinal central rib 10. At each end of each member 5 and 6 is a downwardly extending web 11 from which projects a stud 12 of sufficient length to receive the corresponding eye ends of two links 13—14. One of these links has its other end mounted on a stud 15 projecting from a plate 16 which may be riveted fast to the end of the bucket.

At each end of the bucket at a suitable distance from the bottom thereof there is secured a guide member 17 with two spaced parallel overhanging ribs 18 so shaped as to constitute a dove-tail guide in which there slides a plate 19 having beveled edges adapted to the dove-tail guide, and this plate has projecting therefrom a stud 20 upon which there is mounted the eye end of each of the links 14 remote from the eye end thereof mounted on the pin or stud 12. The stud 20 also receives the eye end of a link 21, the other end of which is pivotally connected by a bolt 22 to the bifurcated end 23 of a link 24, the other end of which latter is mounted on a stud 25 rising from a plate 26 fast on the corresponding end of the body 1 of the bucket a short distance above the bottom thereof, and midway between the sides of the bucket. This link structure is the same at each end of the bucket and extending from the eye ends of the links 21 are the two legs of a yoke 25′ having its connecting member extending lengthwise of the bucket along one side thereof from end to end.

In order to protect the link structure at each end of the bucket from possible damage due to the swinging of the bucket during transportation, the length of the bucket is increased so that the ends of the bucket above the link structures overhang the said link structures, as indicated at 26′.

When the closure members 5 and 6 are in the closed position against the bottom of the bucket, the flanges 8 are in engagement or nearly so with the lower portions of the parts 2 of the sides of the bucket, while the flanges 7 embrace the ends of the bucket and the lip 9 is underriding the adjacent portion of the other member than that on which the lip is formed. The link members under these conditions are in the position shown in Fig. 1, that is, the lower end of each link 13 and the stud 12 by means of which this link is connected to the closure member 5 or 6, are in a vertical plane about mid-way between vertical planes cutting the studs 15 at the two ends of the bucket, and the studs 20 and 25 on the plates or blocks 19 and on the ends of the bucket, respectively. The plates or blocks 19 are at the upper limit of their travel, the links 14 being of sufficient length for this purpose, and the links 21 and 24 are in alinement one with the other, while the yoke 25′ is in its lowermost position. If now a load be deposited in the bucket, the members 5 and 6 cannot yield to the weight of the load, and so open the bottom of the bucket because of the alining of the link members 21 and 24, and, furthermore, the supports for the members 5 and 6 being at substantially the middle point of the width of these members, there is no tendency for the members to move about their pivot supports. If, however, the yoke 25′ be moved from its normal low position to a higher position, such as indicated in dotted lines in Fig. 1, then the link connections 21—24 are flexed, and since the studs 25 are fixed with relation to the bucket, the blocks 19 must, of course, slide along the guide plates 17, thus tending to swing the studs 12 through arcs about the studs 15 in a direction receding from the central vertical longitudinal plane of the bucket. As the members 5 and 6 move away one from the other, the preponderance of load is upon those sides of the members adjacent one to the other, and these members, therefore, tip as they move away one from the other, so that the load finds ready escape in the space between the said members 5 and 6. The engagement of the outer edges of the members 5 and 6 with the sides of the bucket serves to facilitate the pivotal action of the said members and, also, limits the recession of their meeting edges one from the other. When the load has escaped, then the weight of the yoke 25 may cause the return of the closing members 5 and 6 of the bucket to their normal position, in which the closing members of the bucket automatically lock.

In the operation of the system referred to, the bucket on traversing the loading station is brought to rest at an appropriate point to receive the load, and is then caused to proceed on its journey, ultimately leaving the loading station and traveling under the impulse of the power cable over the outgoing aerial cable track to the unloading station where any suitable means in the path of the yoke 25′ will cause the elevation of this yoke as the bucket is carried by such means, and the release of the closure members 5 and 6, so that the contents of the bucket escape, after which on the further progress of the bucket through the dumping or unloading station, the closure members may return to their normal locked closed position either by the action of gravity or through the intermediary of a suitable closing means in the path of the bucket at a subsequent point in its journey through the unloading or dumping station. The bucket is thus in the receiving condition throughout its return journey to the loading station.

In the foregoing description, mention has been made, for convenience of description, to certain planes located with reference to the bucket, and these planes, and, also, the location of certain parts of the bucket were stated with the understanding that the bucket is in its normal pendent position, which position it assumes in operation.

What is claimed is:—

1. In a conveyer bucket, a closure therefor comprising two like closing members meeting at the central longitudinal vertical plane of the bucket, each member being supported at each end solely by a hanger turning about an axis in fixed relation to the bucket body and located at a distance above the bottom of the bucket and more distant from the vertical central plane of the bucket than the connection of the hanger with the respective closure member when the latter is in the closed position.

2. A conveyer bucket having a closure at the bottom thereof composed of two coacting members movable away from each other in the act of dumping the bucket each through an arc described about a relatively fixed point located within the confines of the body of the bucket above the bottom thereof, and each member being also movable about an axis participating in the arc movement of said member.

3. A conveyer bucket provided with matching closing members, each movable through an arc to and from the dumping position described about a point within the confines of the bucket body above the bottom thereof, a sliding member at each end of the bucket and connected to both closure members, and a toggle connection between the sliding support and the bucket body having the toggle members in locking alinement when the closure members are in the closed position.

4. A conveyer bucket having an open bottom, two closure members therefor co-acting to cover the bottom of the bucket when in the closed position, a hanger for each end of each closure member pivotally connected thereto at substantially the middle point of the width of the closure member and movable about an axis within the confines of the bucket body and above the bottom thereof, and means for permitting the swinging of the closure members about their own axes coincident with the point of connection therewith of said hanger and for moving them about the supporting axes of the hangers.

5. A conveyer bucket having an open bottom, two closure members therefor co-acting to cover the bottom of the bucket when in the closed position, a hanger for each end of each closure member pivotally connected thereto at substantially the middle point of the width of the closure member and movable about an axis within the confines of the bucket body and above the bottom thereof, means for permitting the swinging of the closure members about their own axes and for moving them about the supporting axes of the hangers, said means comprising a slide at each end of the bucket body carrying a projecting stud, link connections between the stud and the pivot point of the individual pivots of each closure member, a toggle connection between each slide and a corresponding fixed point on the bucket body, and a connection between corresponding members of the toggle connections at each end of the bucket body for causing simultaneous movement of the slides.

6. In a conveyer bucket provided with an open bottom, closures therefor comprising two like members meeting in the central vertical longitudinal plane of the bucket and provided at each end with a pivot stud, a link support or hanger for each end of each closure member, a supporting stud for the hanger secured to the corresponding end of the bucket body at a point more remote from the central longitudinal vertical plane of the bucket body than is the pivot stud of the closure member when in the closed position, a sliding stud support movable in the central vertical longitudinal plane of the bucket, link connections between the stud support at each end of the bucket and the corresponding pivot studs of both closure members, connected toggle links mounted on the sliding studs at the two ends of the body of the bucket, and other toggle links each connected to one of the first-named toggle links at the corresponding end of the body and movable about an axis within the confines of the corresponding end of the bucket body, which axis is in fixed relation to the said bucket body.

In testimony that I claim the foregoing as my own, I have hereto affixed my signature in the presence of two witnesses.

SEBERN A. COONEY.

Witnesses:
C. E. DOYLE,
F. T. CHAPMAN.